March 28, 1944.  A. N. IKNAYAN  2,345,200
METHOD OF MANUFACTURE OF INNER TUBES
Original Filed Aug. 3, 1940   2 Sheets-Sheet 1
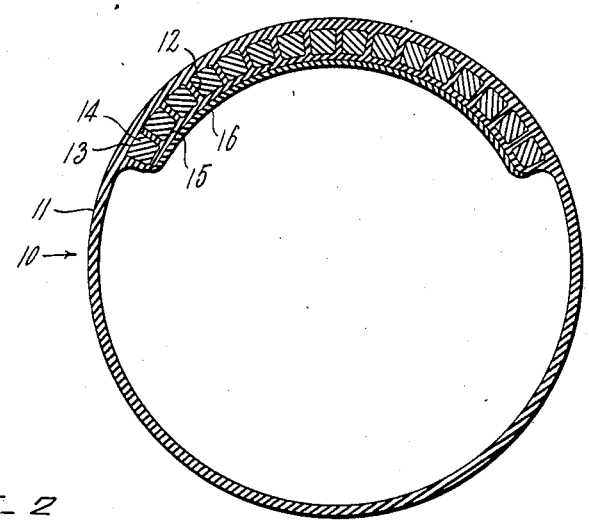
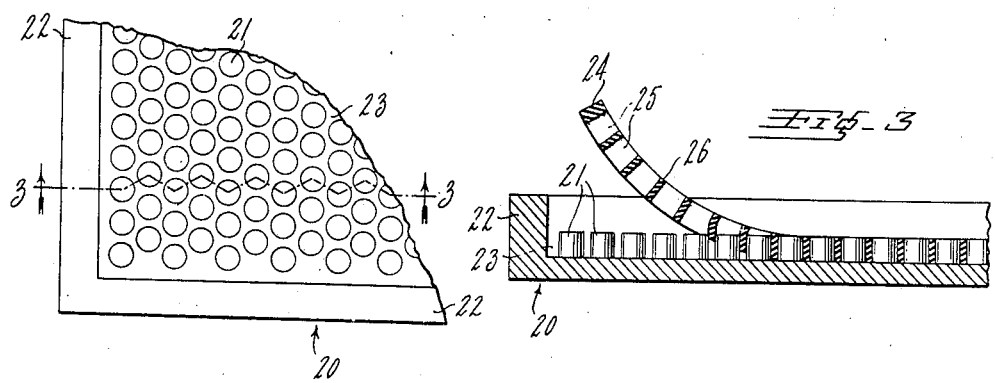
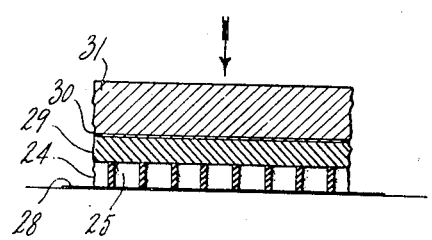
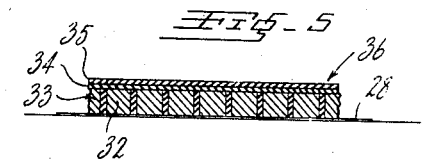
INVENTOR.
ALFRED N. IKNAYAN
BY Lester J. Budlong
ATTORNEY.

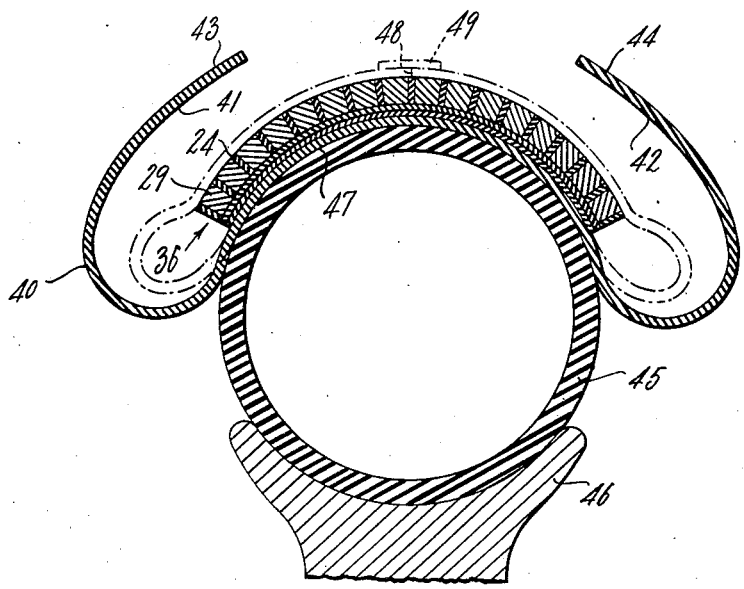
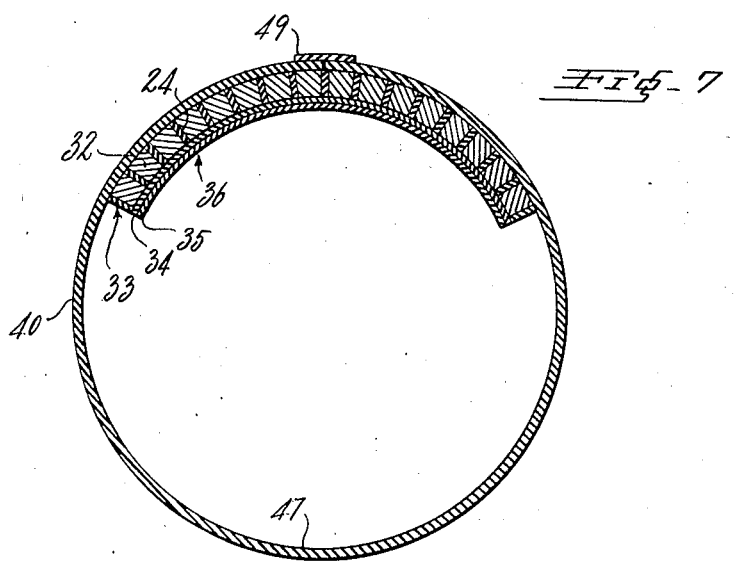

Patented Mar. 28, 1944

2,345,200

UNITED STATES PATENT OFFICE 2,345,200

METHOD OF MANUFACTURE OF INNER TUBES

Alfred N. Iknayan, Indianapolis, Ind., assignor to United States Rubber Company, New York, N. Y., a corporation of New Jersey Original application August 3, 1940, Serial No. 350,243. Divided and this application January 31, 1941, Serial No. 376,741

5 Claims. (Cl. 154—15)

This invention relates to a method of manufacture of inner tubes for pneumatic tires and is a division of my co-pending application Serial No. 350,243, filed August 3, 1940. More particularly it relates to a method of manufacture of inner tubes employing plastic puncture-sealing composition in the tread regions thereof for rendering the inner tubes substantially punctureproof.

Heretofore in the manufacture of puncturesealing inner tubes of the plastic type much difficulty has been experienced in providing suitable means for properly retaining the plastic puncture-sealing composition in position in the tread region of the inner tubes during all conditions of operation thereof. For example, centrifugal force produced by such an inner tube enclosed in a tire and operating at high speeds often caused the plastic composition therewithin to "flow" or shift toward the greatest circumference of the tube, thus leaving the marginal or shoulder portions of the tread region with inadequate material for puncture-sealing purposes. When the plastic composition of such an inner tube was subdivided into a plurality of smaller compartments for preventing this shifting of the plastic material, the partitioning means employed therefor generally occupied much of the total volume of the inner tube wall at the tread region and accordingly proportionally decreased the amount of space available for the puncturesealing composition thereof. Such inner tubes, besides being difficult and expensive to construct were thick, stiff and heavy, so that, when employed in conventional vehicle tires, they produce hard riding qualities and undesirable overheating of the tires and tubes.

The herein described inner tubes and their method of manufacture have substantially eliminated these and other objectionable conditions encountered in plastic puncture-sealing inner tubes of former constructions by providing within the tread region thereof a circumferentially extending honeycomb or grill-like layer of rubber composition having a large number of closely spaced cells formed therein and having each cell thereof filled with plastic puncture-sealing composition. The inner surface of the grill-like structure is covered with two thin layers of rubber composition of differing characteristics so that the one next to the grill-like structure serves to confine the plastic composition in place therein, lends stability thereto and acts as an insulating medium for the other layer while the other layer forms an inner tacky surface for sealing and lubricating purposes in a manner to be hereinafter more fully described.

This invention will be more readily understood when taken in conjunction with the accompanying drawings, in which:

Fig. 1 is a transverse cross-sectional view of a plastic puncture-sealing inner tube produced by the invention;

Fig. 2 is a plan view of a portion of a mold used for forming an element of the inner tube of Fig. 1;

Fig. 3 is a cross-sectional view taken substantially upon line 3—3 of Fig. 2; but showing additionally a plastic grill-like layer partly removed from the mold;

Fig. 4 is a diagrammatical cross-sectional view of a portion of the plastic grill and means for impregnating the grill;

Fig. 5 is a fragmentary cross-sectional view of a composite puncture-sealing strip for use in the construction of the inner tube of Fig. 1;

Fig. 6 is a partial cross-sectional view of an inflatable building drum with a partially assembled inner tube positioned thereon; and Fig. 7 is a cross-sectional view showing the inner tube of Fig. 6 completely assembled and inflated, but prior to the vulcanization thereof.

Refering to the drawings in detail and particularly to Fig. 1, the reference 10 indicates generally a full-molded puncture-sealing inner tube made in accordance with this invention and comprising an endless inflatable tubular wall 11, of rubber composition, upon the inner tread region of which is integrally secured a grill-like layer 12 of rubber composition having properties similar to the rubber composition of the wall 11. This grill-like layer 12 has a plurality of closely spaced cells or openings 13 formed therein, each of which is filled with plastic puncture-sealing composition 14. A comparatively thin partially plastic layer 15 of rubber composition extends over the inner surface of the grill-like layer 12 enclosing and retaining the plastic material 14 in position within these cells, while upon the inner surface of the layer 15 is carried a somewhat thinner layer 16 of tacky rubber composition. The function and operation of these layers, as well as the plastic composition 14 and the grill-like layer 13, will be more fully hereinafter described.

A preferred method of construction of the fullmolded inner tube 10 (Fig. 1) comprises first the step of forming the perforated grill 12. Figs. 2 and 3 show a portion of a flat elongated rectangular mold 20 having a plurality of closely spaced and staggered upstanding pins 21, of uniform height and preferably of circular cross-sectional shape, arranged within marginal walls 22 so as to form therebetween a recess 23. In the formation of the grill-like layer 12 a sheet of vulcanizable plastic rubber composition, having properties substantially the same as the rubber stock employed in the formation of conventional inner tubes is placed upon the upper surface of the pins 21 and within the walls 22. This sheet is then covered by a flat, rigid steel cover-plate (not shown) and subjected to pressure until the plastic material has been forced or "drifted" into all parts of the recess 23. The excess material which remains above the tops of the pins 21 is removed by a hot knife or similar means so that the material remaining in the recess 23 forms a grill-like layer 24 of vulcanizable plastic rubber composition of uniform thickness and defining a great number of closely and uniformly spaced apertures or openings 25 separated by partition walls 26.

Since it would be practically impossible to remove the layer 24 from the mold 20 in its ordinary plastic state without substantially destroying its grill-like shape, the mold 20 and layer 24 are placed in a refrigerating chamber and cooled until the layer 24 attains a temperature of approximately 20° below zero centigrade. The mold 20 and the layer 24 are then removed from the chamber and while the layer 24 remains in this chilled and partially solidified or frozen condition it is stripped from the mold 20 as shown in Fig. 3. Stripping of the layer at this time is possible since this normally plastic rubber composition becomes quite tough and stiff when so chilled and, even though its removal from the mold materially elongates and distorts the layer, the layer possesses the ability of retracting and returning to its original shape when allowed to return to normal room temperature. In this manner the unvulcanized grill-like layer 24 of rubber composition can be easily formed.

The impregnating of the grill-like layer 24 will now be described. A preferred manner for impregnating this plastic layer 24, without destroying its preferred shape, is diagrammatically illustrated in Fig. 4. As the layer 24 is sufficiently stiff, it may be handled without injury and placed upon a strip of fabric 28, such as Holland cloth or Textolin, as a temporary backing while a layer of substantially non-vulcanizable plastic puncture-sealing rubber composition 29 is placed thereon. The thickness of the layer 29 is such that only the correct amount of puncture-sealing composition required for filling all of the cells of the grill 24 is applied thereto. The layer 29 is next covered with a sheet 30 of Holland cloth or Textolin, after which a metallic plate 31 of proper weight and dimension and heated to a temperature of approximately 260° F., is placed upon the assembly and allowed to remain a sufficient amount of time to allow the heat and pressure thereof to soften the plastic layer 29 and force it into the openings 25 of the grill 24, thereby forming individual plastic plugs 32 (Fig. 5). In this way the plastic material 29 is caused to "flow" or "drift" into and completely fill the openings 25, thus forming an impregnated grill-like structure 33 without in any way altering or affecting the physical or chemical properties of the vulcanizable material 24.

While various rubber compositions have been used satisfactorily as the plastic puncture-sealing composition for forming the layer 29, very good results have been obtained when using a rubber stock having the following ingredients:

| | Parts by weight |
|---|---|
| Rubber | 100.00 |
| Resin oil | 5.00 |
| Hydroquinone | 2.00 |

After the impregnated grill 33 has been formed and the fabric 30 removed from the upper surface thereof, a relatively thin insulating layer 34 of vulcanizable rubber composition (Fig. 5) is applied thereto. This layer 34 is formed from rubber stock possessing the ability to vulcanize when heat and a vulcanizing ingredient are added but which stock contains no such vulcanizing ingredient. The purposes for this particular layer will be presently described. While various rubber compositions have been employed successfully in the formation of the layer 34, very satisfactory results are obtainable when using a rubber stock possessing the following ingredients:

| | Parts by weight |
|---|---|
| Rubber | 100.00 |
| Hydroquinone | 2.00 |
| Accelerator (triethyl - trimethylene - triamine) | 2.00 |
| Zinc oxide | 1.00 |
| Zinc lurate | 4.00 |
| Resin oil | 1.00 |

Upon this insulating layer 34 is carried a relatively thin tacky layer 35 of rubber composition, which may possess the same ingredients as the rubber composition of the plastic layer 29. In this manner a composite puncture-sealing plastic strip 36 is formed for placement within an inner tube.

The assembly of the parts for forming the preferred puncture-sealing inner tube of Fig. 1 is accomplished in the following manner. An annular tubular wall 40, which may be a full-molded conventional vulcanized or partly vulcanized inner tube, is cut circumferentially along its tread region (Fig. 6), after which relatively wide circumferentially extending inside marginal portions 41 and 42 and somewhat narrower circumferentially extending outside marginal portions 43 and 44 of the tubular wall 40 are buffed. The tube is then placed upon an inflatable endless tubular mandrel 45, of proper predetermined size, carried upon a rotatably mounted supporting drum 46 with the rim region 47 of the inner tube 40 positioned next to the mandrel. The mandrel 45 is then expanded through suitable valve means (not shown), until the rim region of the inner tube is stretched outwardly into the general position shown in Fig. 6. The inner surface of the tube at the rim region 47 is then coated with soapstone, talc or the like, to prevent any adhesion thereto, after which the composite plastic strip 36 is circumferentially placed along this surface with the layer 35 adjacent the coated surface. The fabric covering 28 is removed from the grill as it is placed in position upon the rim region. Because of the plastic condition of the composite strip 36, it can be easily pressed or drawn downwardly smoothly over and around the curved shape of the mandrel. The opposite ends of the composite strip are at this time spliced together. When the composite strip 36 has been so positioned upon the mandrel, it assumes the general shape it is to possess ultimately in the completed vulcanized inner tube.

The inner marginal portions 41 and 42 are next coated with rubber cement and after sufficient time has been allowed for the cement to dry, the marginal portions are pressed, as indicated by dotted lines (Fig. 6), into adhesion with the outer surface of the composite strip 36 with the free edges thereof in abutting relationship at the center thereof as indicated at 48. The outer marginal portions 43 and 44 are then similarly coated with rubber cement and allowed to dry, after which a strip 49 of vulcanizable rubber composition is placed over the joint 48 and arranged to extend circumferentially about the inner tube.

The inner tube 40 with the composite layer 36 adhering to the inner tread region thereof may now be removed from the mandrel 45 and inflated by conventional valve means (not shown). The assembled inner tube (Fig. 7) is thus ready to be placed in a cold vulcanizing mold, further inflated for vulcanizing purposes, and vulcanized at a temperature in the neighborhood of 310° F. for a period of approximately 45 minutes. In this manner the inner tube and all interior vulcanizable parts thereof which go to make up the plastic puncture-sealing inner tube of Fig. 1 are fully molded or cured to shape. After sufficient time has been allowed for the tube to become properly vulcanized, it is desirable to remove both the vulcanizing mold and tube from the heating element or vulcanizer and jointly cool these members before the mold sections are opened. The purpose for this step is to prevent the formation of gas pockets, or the like, in the hot puncture-sealing composition within the tube.

During vulcanization of the assembled inner tube of Fig. 7, the grill-like layer 24 vulcanizes and becomes integrally bonded to the tread portion of the inner tube 40. The plastic plugs 32, being of practically non-vulcanizable material, absorb very little vulcanizing ingredients from the adjacent inner tube wall 40 and grill 24 and thereafter attains and remain in a stiff plastic condition. The insulating layer 34, which possesses the ability of vulcanizing readily when a vulcanizing agent is supplied, absorbs into localized areas contacting the perforated layer 24 vulcanizing ingredients therefrom and becomes partially vulcanized around such area while other parts thereof remote from the grill 24 remain in substantially unvulcanized condition. This layer 34 not only serves to confine and lend stability to the plastic material within the cells of the grill 24 but at the same time serves as an insulating layer between the grill and the layer 35, preventing the migration of sulphur or the like to the layer 35. Thus it will be seen that the layer 35 can absorb no vulcanizing ingredients from other portions of the tube during vulcanization of the assembly and thus remains in an unvulcanized condition, becoming exceedingly tacky from the vulcanizing process. The strip 49 flows, during vulcanization, into and over the joint formed between the edges of the wall 40 and completely covers the circumferential cut made at such location. In this way the assembled parts of the inner tube become full-molded to a predetermined shape and form the puncture-sealing inner tube of Fig. 1.

Should a penetrating medium puncture the tread portion of the inner tube of Fig. 1 while the tube is in service in a conventional tire, it will pass either through the plastic sealing composition 14 or through the much tougher material of the grill 12, continuing through the layers 15 and 16 to the interior of the tube. In either case the tacky layer 16 will immediately tenaciously adhere to the penetrating medium and form a seal preventing the escape of air. If the penetrating medium is subsequently withdrawn, the tacky material will have a tendency to be drawn into the opening formed thereby and completely close the opening. In cases where the penetrating medium passed through one or more of the cells of the grill 12, the tacky material of the layer 16 tends to serve as a lubricant as the penetrating medium is being withdrawn therefrom, thus preventing the medium from dragging the stiffer plastic material 14 from the individual cells. The tacky material also forms a temporary seal at such times which functions until the plastic material within the grill, which depends largely upon the flexing of the inner tube for effecting its sealing action, has had sufficient time to unite and form a permanent seal.

It should be noted that while the layer 16 is in a very tacky condition in the inner tube 10 this layer is not of such thickness as to render it unstable at high speed but instead remain immobile or stationary in the inner tube during service in a vehicle tire. It does not "flow" or shift under the influence of heat and centrifugal force as would a layer of greater thickness. It should also be noted that the grill 12, besides serving as a confining means for the puncture-sealing composition, also serves as a reinforcing medium which greatly resists tearing of the wall of the inner tube when same is punctured in service. In fact, circular openings in the grill-like layer have been found to produce greater resistance to tear in this layer than were obtained in other cases where square, triangular or other angularly shaped openings were used.

It will be seen from the foregoing description that I have produced a full-molded plastic puncture-sealing inner tube having a large number of closely spaced cells impregnated with puncture-sealing composition by a very practical and efficient method. It will also be noted that this inner tube is comparatively of light weight and very flexible so that the riding qualities of a tire in which it is being used are not materially affected.

While the above is a preferred embodiment and method of manufacture of the inner tube of my invention, I do not desire to be limited thereby except insofar as is set forth in the appended claims.

Having thus described my invention what I claim and desire to protect by Letters Patent is:

1. The method of producing full-molded puncture-sealing inner tubes for pneumatic tires comprising the steps of forming a grill-like layer of vulcanizable rubber composition, filling the openings of said vulcanizable layer with puncture-sealing composition, applying a layer of rubber composition, which will not vulcanize unless vulcanizing ingredients are added thereto, to the exposed surface of said vulcanizable layer, applying a third layer of rubber composition to the exposed surface of the second named layer, said non-vulcanizable layer being of such composition as to become tacky when subjected to heat and thereafter remain in such tacky condition, applying the opposite surface of the vulcanizable layer to the interior tread region of an inner tube, and inflating and vulcanizing the assembled structure in a conventional inner tube mold of predetermined size.

2. The method of producing full-molded puncture-sealing inner tubes for penumatic tires comprising the steps of forming a grill-like layer of vulcanizable rubber composition, filling the openings of said vulcanizable layer with puncture-sealing composition, placing the impregnated vulcanizable layer upon the rim region of a preformed inner tube which has been circumferentially cut along its tread region and mounted with its tread region in an outwardly stretched condition upon a circular mandrel of predetermined size and cross-sectional shape, adhering the cut marginal portions of the inner tube to the exposed surface of the vulcanizable layer with the cut edges thereof in abutting relation, removing the assembled structure from the mandrel, and inflating and vulcanizing the structure in a conventional inner tube mold of the same dimensions as the mold used in the formation of the preformed inner tube.

3. The method of producing full-molded puncture-sealing inner tubes for pneumatic tires, comprising the steps of circumferentially cutting a preformed inner tube along its tread region, placing the cut inner tube upon a circular mandrel of predetermined size and cross-sectional shape so as to have its rim region outwardly stretched, placing an impregnated vulcanizable grill circumferentially upon the stretched rim region, adhering the opposite marginal portions of the cut inner tube to the exposed surface of the vulcanizable grill with the cut edges thereof in abutting relationship, removing the assembled structure from the mandrel, and inflating and vulcanizing the structure in a conventional inner tube mold of the same dimensions as the mold used in the formation of the preformed inner tube.

4. The method of producing full-molded puncture-sealing inner tubes for pneumatic tires comprising the steps of forming a grill of vulcanizable rubber composition in an unrestrained condition, pressing a sheet of plastic puncture-sealing composition into the openings of said grill, applying the plastic filled vulcanizable grill circumferentially to the tread region of an annular tubular wall of rubber composition, and inflating and vulcanizing the assembled structure in a conventional inner tube mold of predetermined size.

5. The method of producing full-molded puncture-sealing inner tubes for pneumatic tires comprising the steps of forming a grill of vulcanizable rubber composition, heating and pressing a sheet of plastic puncture-sealing composition into the openings of said grill, adhering an insulating layer of rubber composition to a surface of said grill, said layer of rubber composition being of such character as to vulcanize only when a vulcanizing ingredient is added thereto, adhering a non-curing layer of rubber composition to the exposed surface of the last named layer, placing the assembled structure with the layers downwardly upon the interior rim region of a preformed inner tube which has been cut circumferentially along its tread region and mounted with its tread region in an outwardly stretched condition upon a circular mandrel of predetermined size and cross-sectional shape, adhering the cut marginal portions of the inner tubes to the exposed surface of the vulcanizable grill with the cut edges thereof in abutting relationship, removing the assembled grill and tube from the mandrel, and inflating and vulcanizing the same in a conventional inner tube mold of the same dimensions as the mold used in the formation of the preformed inner tube.

ALFRED N. IKNAYAN.